Jan. 30, 1940.  W. F. GROENE ET AL  2,188,594
CRANKSHAFT CHUCK
Filed Nov. 28, 1938  2 Sheets-Sheet 1
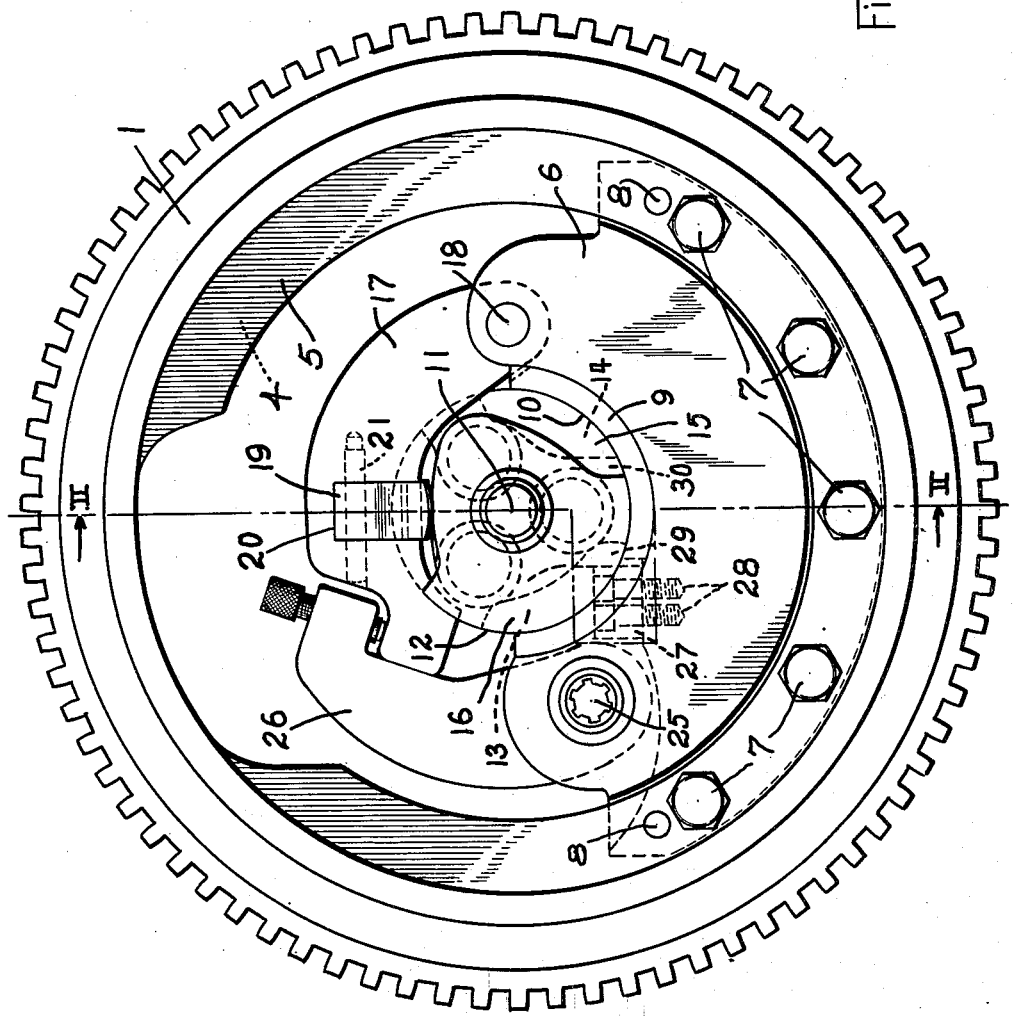
Fig. I.
WITNESS.
Elmer R. Shipley.
INVENTORS.
WILLIAM F. GROENE
WALTER R. MEYER
BY Willard S. Groene
ATTORNEY.

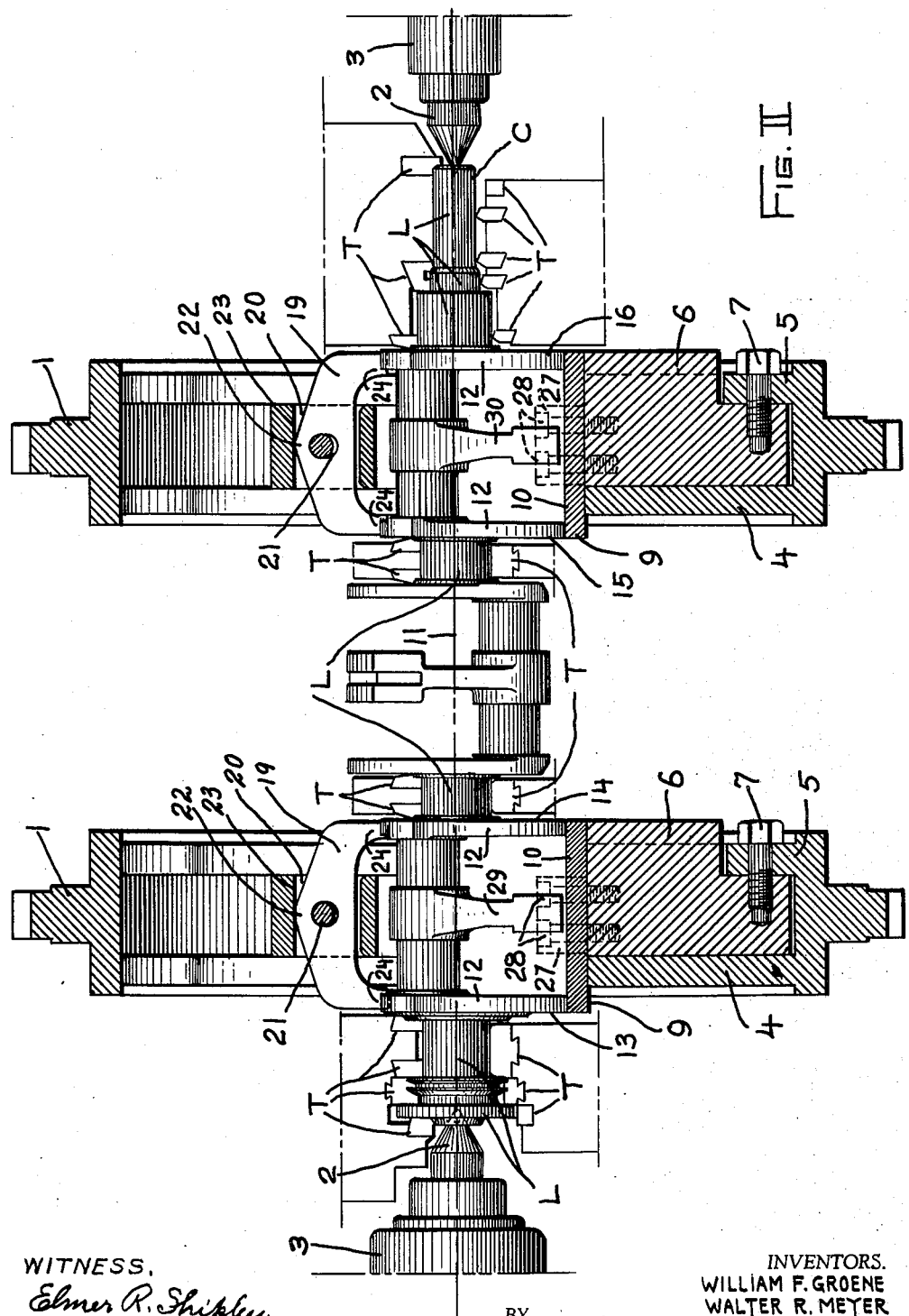

Patented Jan. 30, 1940

2,188,594

UNITED STATES PATENT OFFICE 2,188,594

CRANKSHAFT CHUCK

William F. Groene and Walter R. Meyer, Cincinnati, Ohio, assignors to The R. K. Le Blond Machine Tool Company, Cincinnati, Ohio, a corporation of Delaware Application November 28, 1938, Serial No. 242,705

7 Claims. (Cl. 82—40)

This invention pertains to chucking mechanism which is adapted to grip crankshafts by means of peripheral machined locating areas prepared on webs of the crankshaft as shown, for example, in our co-pending application Serial No. 121,509, filed January 21, 1937.

An object of this invention is to provide a chuck with a fixed arcuate supporting and locating abutment which is adapted to engage a machined peripheral locating area on a web of a crankshaft and having a cooperating clamping means to hold the shaft in proper engagement with said locating abutment.

Another object is to provide a fixed arcuate locating abutment in the chuck body which is adapted to engage a finished peripheral locating area on a web of said shaft and to provide a positive driving means and a clamping means in conjunction with said abutment to maintain the crankshaft in proper engagement with said chuck abutment.

Still another object is to provide a pair of axially spaced arcuate abutments in the chuck body adapted to engage peripheral locating areas on a pair of webs of a crankshaft and to provide equalizing clamping means in conjunction with said abutments to maintain proper engagement of the crankshaft with the locating abutments in the chuck.

Further features and advantages of this invention will appear in the course of the following description of the drawings in which:

Figure I is an end elevation of the chucking device gripping a crankshaft, having machined peripheral locating areas, in a ring gear of a double center drive lathe.

Figure II is a diametral section substantially on the line II—II of Figure I showing the crankshaft chucked in the ring gears of the double center drive lathe.

For illustrative purposes the invention is shown applied to a double center drive crankshaft lathe, for example of a character shown in Patent 2,069,107 dated January 26, 1937, having a pair of ring gears 1 and associated cutting tools T for machining the line bearing portions L of a crankshaft C. The crankshaft C is usually steadied at its ends by centers 2 carried in appropriate tailstocks 3, though, this is not essential to the proper operation of the chucking devices in the ring gears 1.

In each of the ring gears 1 are provided flanges 4 and 5 which properly locate the segmental chuck body 6 which is fixed to the flange 5 by bolts 7 and dowel pins 8. Fixed in the body 6 is the arcuate locating bushing 9 which has its semi-circular locating surface 10 arranged concentric with the axis of rotation 11 of the crankshaft C in the lathe. The crankshaft C has the periphery 12 of its various webs 13, 14, 15 and 16 accurately machined relative to the axis 11 and dimensioned to accurately fit against the locating surfaces 10 of the bushings 9 to thus accurately locate the crankshaft in the lathe.

A clamp 17 pivotally mounted by a pin 18 on the body 6 has a transverse equalizer bar 19 carried in a slot 20 of the clamp which is maintained therein by a suitable pin 21 fixed with clamp 17 and passing through a clearance hole 21 in the bar 19. The bar 19 has a fulcrum point 22 which bears against the surface 23 of the slot 20 to permit free rocking of the bar so that its work contacting ends 24 firmly engage the rough surfaces of the various webs 13, 14, and 15, 16 to hold the webs in firm engagement with the arcuate locating bushings 9. Suitable eccentric clamping means 25 actuating the latch 26 in a manner fully described in Patent 2,030,020 dated February 4, 1936, serves to force the clamp 17 against the work.

In order to prevent rotation of the crankshaft C on the locating bushings 9 under the turning forces exerted by the tools T, fixed driving blocks 27 are mounted on the body by the screws 28 and abut against the webs 29 and 30 of the crankshaft to provide a positive driving force intermediate the respective webs 13—14 and 15—16.

Having thus fully set forth and described our invention, what we claim and desire to secure by United States Letters Patent is:

1. In a chucking device for crankshafts, a rotary chuck body, a fixed arcuate locating abutment in said chuck body adapted to engage a peripheral locating area on a web of a crankshaft to be gripped in said device, clamping means for holding said crankshaft in engagement with said abutment, and fixed driving means in said body to positively rotate said crankshaft with the rotation of said chuck body.

2. In a chucking device for crankshafts, a rotary chuck body, a fixed arcuate locating abutment in said chuck body adapted to engage a peripheral locating area on a web of a crankshaft to be gripped in said device, clamping means engaging the webs having said locating areas for holding said crankshaft in engagement with said abutment, and fixed driving means in said body to positively rotate said crankshaft with the rotation of said chuck body.

3. In a chucking device for crankshafts, a rotary chuck body, a fixed arcuate locating abutment in said chuck body adapted to engage peripheral locating areas on a plurality of axially spaced webs of a crankshaft to be gripped in said device, clamping means engaging the webs having said locating areas for holding said crankshaft in engagement with said abutment, and fixed driving means in said body to positively rotate said crankshaft with the rotation of said chuck body.

4. In a chucking device for crankshafts, a rotary chuck body, a fixed arcuate locating abutment in said chuck body adapted to engage peripheral locating areas on a pair of axially spaced webs of a crankshaft to be gripped in said device, equalizing clamping means engaging the webs having said locating areas for holding said crankshaft in engagement with said abutment, and fixed driving means in said body to positively rotate said crankshaft with the rotation of said chuck body.

5. In a double center drive lathe, a pair of synchronously rotatable ring gears, chucking devices in said ring gears having fixed arcuate locating abutments adapted to engage peripheral locating areas on axially spaced webs of a crankshaft to be chucked in said lathe, equalizing clamping means engaging the webs having said locating areas for holding said crankshaft in engagement with said abutments, and driving means in said ring gears to positively rotate said crankshaft with said gears.

6. In a double center drive lathe, a pair of synchronously rotatable ring gears, chucking devices in said ring gears each having fixed arcuate locating abutments adapted to engage peripheral locating areas on axially spaced pairs of webs of a crankshaft to be chucked in said lathe, equalizing clamping means in each ring gear engaging the webs having said locating areas for holding said crankshaft in engagement with said abutments, and driving means in said ring gears to positively rotate said crankshaft with said gears.

7. In a double center drive lathe, a pair of synchronously rotatable ring gears, chucking devices in said ring gears each having fixed arcuate locating abutments adapted to engage peripheral locating areas on axially spaced pairs of webs of a crankshaft to be chucked in said lathe, equalizing clamping means in each ring gear engaging the webs having said locating areas for holding said crankshaft in engagement with said abutments, and driving means engaging other of the webs of said crankshaft to positively rotate said crankshaft with said gears.

WILLIAM F. GROENE.
WALTER R. MEYER.